Figure 1:
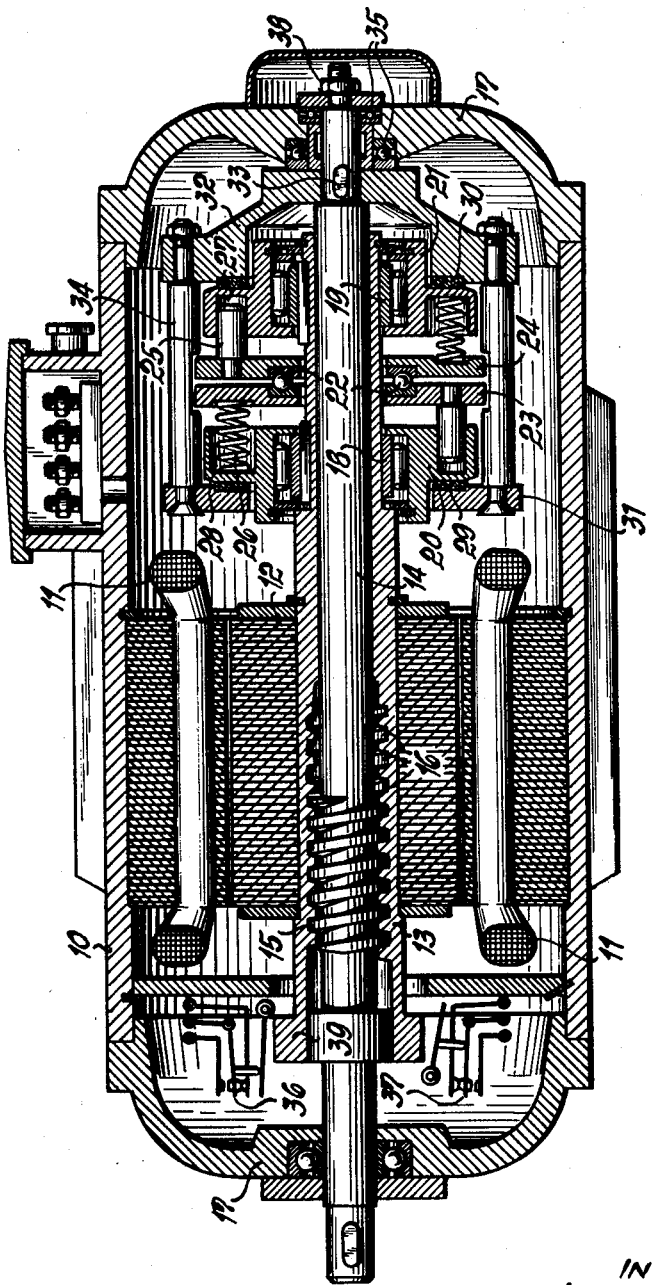

Jan. 12, 1965 H. KORTHAUS ETAL 3,165,656
ELECTRIC MOTOR WITH OVERLOAD CUT-OUT
Filed March 5, 1963 3 Sheets-Sheet 2

INVENTORS

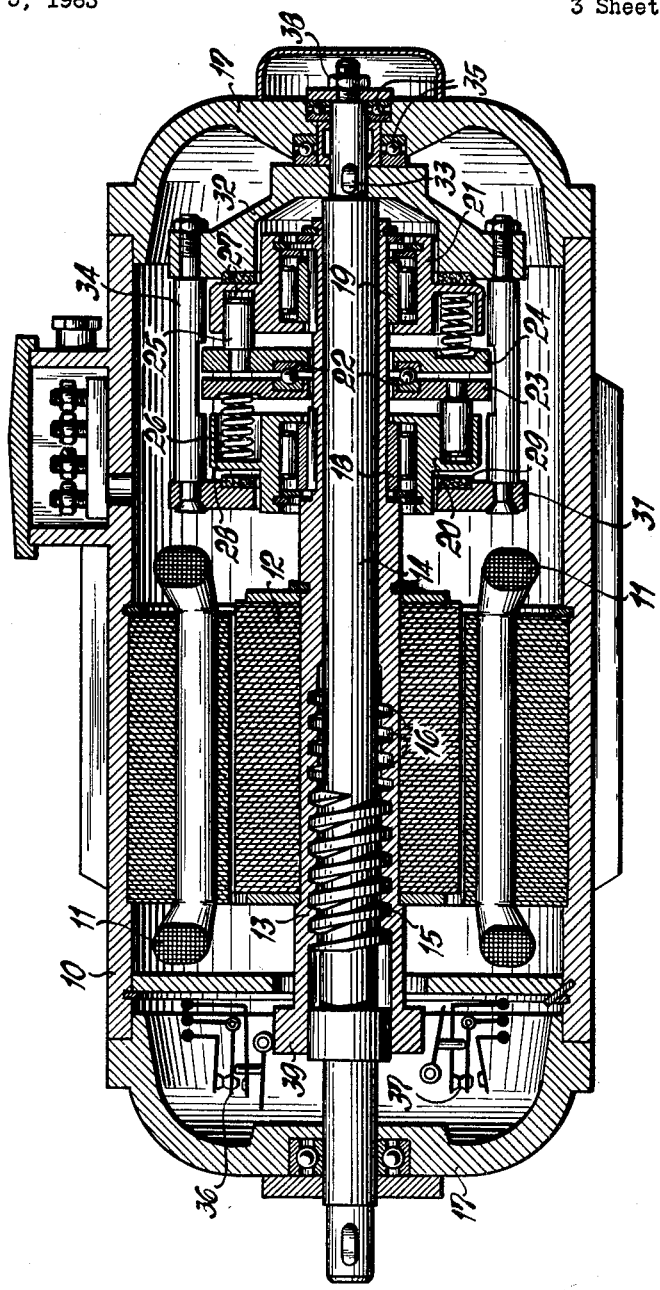

United States Patent Office 3,165,656
Patented Jan. 12, 1965

3,165,656
ELECTRIC MOTOR WITH OVERLOAD CUT-OUT
Helmut Korthaus, Fernblick 3, Wuppertal-Barmen, Germany, and Richard Wilke, Eschfeldstrasse 11, Gelsenkirchen-Buer, Germany
Filed Mar. 5, 1963, Ser. No. 262,910
14 Claims. (Cl. 310—76)

The present invention relates to an electric motor with overload cut-out, in general, and to an electric motor for direct current, alternating current or three-phase current, which electric motor is switchable in two directions of rotation with pre-selectible number of revolutions including a stator winding, a so-called stator and a rotor formed as a slider provided at the motor output, as well as with an overload cut-out, in particular.

In the practical application of electric motors as drives, situations are encountered, in which the motor does not run continuously through, rather it is operative for a limited time period only, in order to perform timely limited, mechanical movements by means of gear drives, gear racks, crank drives or other mechanical power transmission devices. These movements, for instance the opening and closing of a valve or of a slide, of a railing or of a door, are limited, by their nature by the mechanical end positions. The valve or the slide is either closed, or it is open, while the railing or the door is either closed or it is opened.

The transformation of the device to be operated mechanically from one to the other end position is brought about practically, for instance, by the rotation of the shaft of an electric motor, which provides the required torque. Upon reaching the prevailing end position, the electric motor must be shut off and must be rendered operative for operation of the movement in the opposite direction. For this purpose electrical limit contacts are generally used and practically applied, which limit contacts are operated, by the movement of the parts to be opened or to be closed or generally of the parts to be moved, as valves, slides, railings, doors or the like, mechanically or without contacts by a magnetic force, light rays or by other known means. These limit contacts must be connected by electrical conduit with the switch or relay coordinated to the electric motor. If the limit contacts have not been operated in due time prior to reaching the terminal or end position by the mechanism to be moved, then a situation arises, according to which the electric motor is not switched off timely enough and the electric motor drives the mechanism with its maximum torque force, in case of use of three-phase synchronous motors with its pull-out torque into the terminal position, whereupon damages of the mechanism or of the electric motor can occur. In rough and soiled operations, the danger exists also, that the limit contacts do not remain always operative and that the control leads are interrupted.

In other cases occurring practically during operations, it is required for the driving electric motor, that it delivers a limited torque only which is transformed, for instance, by a pulling force in winding- and spooling-machines, so that the part to be pulled, for instance, a wire or a thread does not tear off.

It is, therefore, one object of the present invention to provide an electric motor with overload cut-out, which is of the type which, on the one hand, is advantageously usable for the above-mentioned applications, and, on the other hand, also eliminates the lackings of the motors used before.

It is another object of the present invention to provide an electric motor with overload cut-out, wherein for achieving an overload cut-out, an overload coupling is provided within the motor housing, which overload coupling transmits the motor torque to the output shaft, while being in operative connection with the rotor, as well as with the motor output shaft, whereby the overload coupling is adjustable as to the deliverable motor torque and wherein upon passing over this torque, the connection of the forces or of the drive between the rotor and the overload coupling is interrupted or released. In addition, switches or limit contacts are provided within the motor housing for switching on or off the current to the motor, which contacts are switchable dependent upon the position of the coupling such, that immediately with the opening procedure of the coupling and of a coupling part, respectively, the motor is electrically switched off or switched over.

By this arrangement of the present invention, an electric motor is created, the output torque taken from its shaft is limited by a device disposed in the motor housing to fixedly settable values. Upon passing over the set torque, the rotor of the electric motor disengages itself from its rotor shaft. Simultaneously, contacts disposed likewise in the motor housing are operated, which switch off electrically the electric motor and, thus, cause a resting position thereof. Furthermore, the motor, designed in acordance with the present invention, is to be used with advantage for the reason that it is adjustable to a desired maximum torque and brings about appreciable simplifications in the mechanical and electrical mounting by the arrangement of the limit contacts in a single housing, whereby, also all parts are protected from outer interferences, for instance, soiling and humidity.

It is yet another object of the present invention to provide an electrical motor with overload cut-outs, wherein the coupling serving as overload cut-out comprises substantially two free-wheel or coasting drives effective in opposite rotary directions and mounted on the rotor shaft, each of the free-wheel or coasting drives cooperating with a coupling disk, which coupling disks in turn are retained axially spaced apart from each other for independent rotation, and furthermore, each of which is in operative connection with a housing part of a two-part coupling housing, which housing part assumes the output of the coupling on the motor output shaft, whereby the coupling disks are retained for independent rotation by means of separation disks spaced apart from each other by an axial thrust bearing, and disposed between the coupling disks while, however, each separation disk is coupled for joint rotation with its corresponding coupling disk.

The axial displacement of the rotor shaft can be used for the operation of this coupling, in accordance with the present invention, which should not exclude, however, that in case of a constructive change, under certain circumstances also the axial displacement of, for instance, the motor shaft, can be used for this purpose. The motor output comprises here two shafts disposed telescopically relative to each other, whereby one of the shafts is hollow and operates as a carrier for the rotor, and serves as well also for the driving part of the coupling, which has been described before, while the output part of the overload coupling is mounted on the motor output shaft disposed in the hollow shaft of the rotor and, whereby, furthermore, the motor output shaft and the rotor hollow shaft is formed for a part of his length as a spindle and as a spindle nut, respectively, so that, for instance, the rotor hollow shaft is in a position to displace itself in axial direction by rotation on the rotor output shaft and to operate the coupling.

Figure 2:
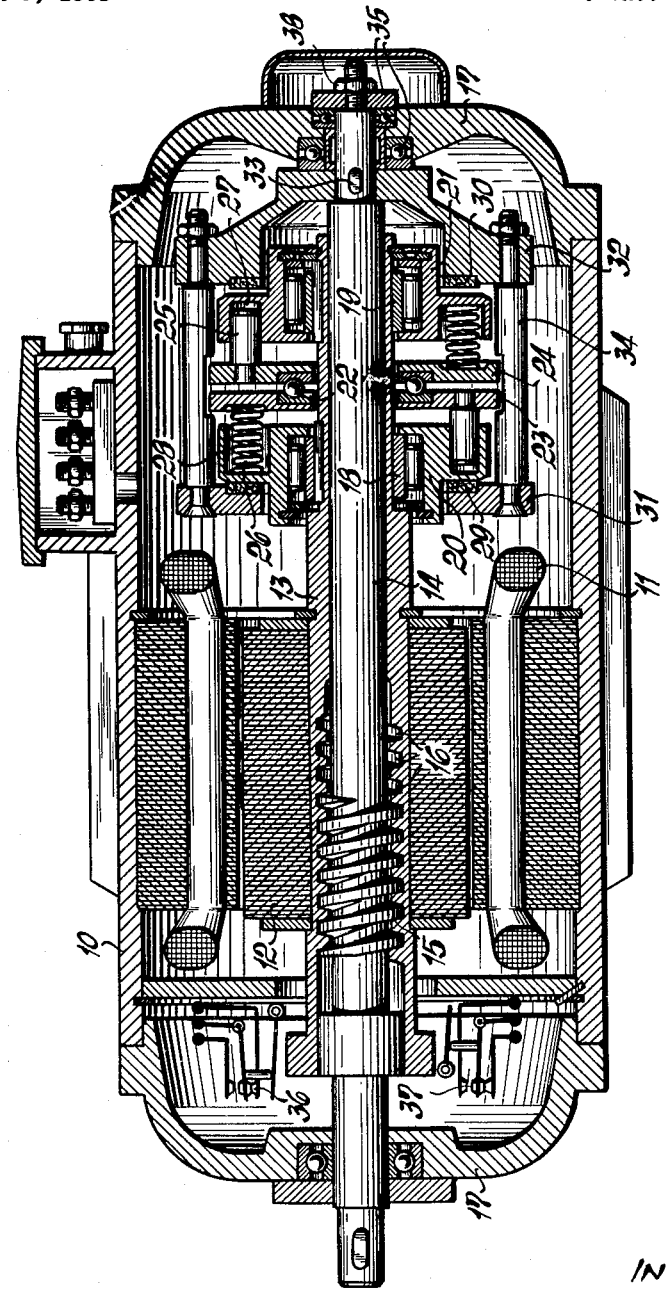

With these and other objects in view, which will become apparent in the following detailed description, the present invention will be clearly understood in connection with the accompanying drawings, in which:

FIGURE 1 is an axial section of the electric motor showing the coupling in the mounting or starting position;

FIG. 2 is an axial section of the electric motor similar to that shown in FIG. 1, the coupling of the electric motor being shown, however, in the braking position for one direction of rotation; and FIG. 3 is an axial section similar to that shown in FIG. 2, the coupling being shown, however, in the counter-braking position, whereby a braking takes place in a direction of rotation opposite to that shown in FIG. 2.

Referring now to the drawings, the electric motor comprises a stator winding disposed in a motor housing 10, namely a so-called stator 11 of a three-phase electric motor. The rotor 12 formed as a slider is rigidly secured to the motor output and, in particular, is impressed on a hollow shaft 13, which carries inside thereof the actual motor output shaft 14. The latter is disposed coaxially with and inside of the hollow shaft 13 and both shafts 13 and 14 are formed for a part of their length as a spindle 15 and as a spindle nut 16, respectively, whereby the hollow shaft 13 has formed therein an inner thread to constitute the spindle nut 16 and the motor output shaft 14 disposed inside of the hollow shaft 13 has formed thereon an outer thread to constitute a spindle 15. The motor output shaft 14 is mounted in turn in two bearing covers 17 disposed at the opposite ends of the motor housing 10.

In order to avoid that the rotor 12 is displaced on the motor output shaft 14 during its start by means of the spindle thread 15 and 16, a coupling device is provided between these two parts inside of the motor housing 10, which coupling device is more clearly described below.

Two roller bearings 18 and 19 effective in known manner as free-wheels in opposite directions of rotation are disposed on the hollow rotor shaft 13 axially spaced apart from each other. These two roller bearings 18 and 19 are thus effective in opposite directions, that means, in one rotary direction one bearing runs freely without transmitting a torque, while the other bearing in its locking position transmits a torque or a rotary movement. In the other direction of rotation, the just opposite effect takes place.

The hollow shaft 13 is connected by means of these free-wheel or coasting drives with two coupling disks 20 and 21 pressed on the outside of the roller bearings 18 and 19. It is, thereby, apparent, that in accordance with the direction of rotation always the coupling disk which is connected with the locked free-wheel forms operative closed forces and is in operative connection with the hollow shaft 13. Since the two coupling disks 20 and 21 formed, for instance, as hollow bodies, can perform movements in opposite directions and always one of the coupling disks rests, respectively, both coupling disks 20 and 21 are retained in spaced apart position from each other for independent rotation by means of a thrust bearing 22. The latter is disposed between two separating disks 23 and 24, which carry alternately a follower bolt 25 and a pressure spring 26 distributed along the periphery of the separating disks 23 and 24. The center bores in the separating disks 23 and 24 are of such diameter, that both disks are mounted freely wheeling without engagement on the hollow shaft 13.

One of the coupling disks 20 or 21 is always connected for joint rotation with its corresponding separation disk 23 or 24 by means of the follower bolts 25, which are disposed in corresponding recesses 27 of the coupling disks 20 and 21 and are axially movable therein. Each of the two coupling disks 20 and 21 is urged against a corresponding brake-layer 29 and 30, respectively, by means of the springs 26, which are likewise disposed in corresponding recesses 28 of the coupling disks 20 and 21 and are immovably secured to the separation disks 23 and 24. Each of the brake-layers 29 and 30 is in turn arranged in the corresponding part of a two-part housing 31 and 32. This two-part housing 31 and 32 is, on the one hand, connected for rotation with the motor output shaft 14 by means of a groove and key 33 and, on the other hand, is mounted free-wheeling on the coupling disks 20 and 21 by means of connecting screw bolts 34.

The operation of the electric motor takes place in the following manner:

If current is fed to the stator winding 11 of the electric motor, the rotor 12 reaches in parts of a second its full number of revolutions, as is well known. Due to the the mass inertia and the resting friction in the hollow rotor shaft 13 with the spindle thread 15 and 16, the motor output shaft 14 is joined for rotation over the described coupling device, whereby, depending upon the direction of rotation, one of the two free-wheels locks. The mechanism to be driven, a slide, a door, or the like, is thereby, for instance, closed.

As soon as the slide, the door, or the like reaches its end position, the motor output shaft 14 is braked more or less joltingly at the terminal position of the slide, door or the like. At this moment, the hollow shaft 13 pressed into the rotor 12 turns on the motor output shaft 14, which motor output shaft 14 cannot displace itself axially due to two thrust bearings 35 provided in the bearing covers 17. At this moment, the condition, shown in FIG. 2 of the drawings, will occur, whereby corresponding to the direction of rotation the coupling disk 21, connected with the hollow shaft 13 at this direction of rotation for joint rotation by means of the non-locked free-wheel 19, is axially displaced for a small length on the roller bearing 19, so that the brake 29 of the coupling disk 20 connected by the flow of forces is lifted. By this arrangement, the flow of forces between the motor output shaft 14 and the rotor 12 is interrupted.

Due to the small axial displacement of the hollow shaft 13, the upper switch 36 is simultaneously opened, so that the main voltage is shut off, that means, the motor is disconnected. Due to the friction between the spindle 15 and the spindle nut 16, the brake 29 remains open also after a stillstand, so that the motor cannot be switched on again in this direction of rotation and the mechanism to be operated cannot be strained unnecessarily in its end position.

It is, however, in this connection also possible without any difficulty to switch on the motor in the chosen example in opposite direction and to open again the closed slide, the door or the like, by phase inversion in the three-phase motor, since the other brake 30 has remained in operative connection with the other coupling disk 21 and also the lower switch 37 is closed. If the slide, the door or the like is then opened again, the switching-off procedure is repeated, since now the brake 30, which has been in operative position, is opened and the other counter brake 29 is simultaneously closed again, so that the position shown in FIG. 3 will be obtained.

It is also within the scope of the present invention to provide the possibility by corresponding choice of the pressure springs 26 and of their pretension, to keep the torque output of the motor below its pull-out torque, rather it can be held below the rated torque, so that the electric motor is never overloaded.

In addition, by the limitation of the rotation between the spindle and the spindle nut 16, due to the yielding pressure springs 26, it is avoided that the spindle thread can run tight in its end or terminal position. To the contrary, the abutment limitation of the mechanism to be operated is elastically absorbed by the pressure springs in the electric motor.

It is also possible to use without difficulty small switching contacts having a high switching output, as the switches 36 and 37, which switches 36 and 37 can easily be disposed in the motor housing 10. In case of not too great motor outputs, the further appreciable advantage results, that it is possible to switch first of all such smaller motors as three-phase motors or direct current motors over a simple built-up rotary switch for right and left movement, without necessitating a reversing relay. This amounts to a simplified mounting and a not unappreciable economy in the total device.

It is also possible to use switching contacts, for instance, in form of micro-switches, which are operated by the hollow rotor shaft 13 displacing itself, in order to report the operating condition by telecommunication means and/or to release further automatic procedures.

It is to be understood, in connection with the description of the operation of the electric motor, that the switched on motor and the mechanism operated thereby can be stopped in between prior to reaching the terminal position, so that also intermediate positions can be arrived at by simple operation of the motor switch.

A particularly sensitive torque limitation, as it has been described as advantageous in the statement covering winding- and spooling-machines, is obtained with this motor, if the friction between the spindle nut 16 and the spindle 15 is maintained at a very small value. This can be brought about, by using known spindle threads with running balls, as it is also applied, by example, in the automotive field for the steering wheel. Due to a low friction in the spindle nut 16 of the rotor 12, the hollow shaft 13 is then retained elastically in its center position, due to the pressure of the springs 26. Only when the torque taken from the output shaft 14 surpasses a value defined by the spring pressure, is the hollow shaft 13 displaced on the motor output shaft in the described manner and releases the coupling parts 20 and 21 by means of the opening brakes 29 and 30, and switches off the motor by means of the switching contacts 36 and 37.

The rotor 12 with its hollow shaft 13 is displaced again into its center position now after this procedure, due to the lower friction between the spindle 15 and the spindle nut 16 by the pressure of the springs 26. The brake closes again and the switching contact returns into its original position.

It is now possible, depending upon the connection of the motor to the network, that either the motor starts running again automatically over the switch closing again, or stands still, until it is switched on again over a switching relay. This re-switching can be performed manually, as well as automatically in accordance with a predetermined program.

Finally, the motor structure is simplified, if the motor is to be designed for one direction of rotation only, so that the coupling device has to be effective only for this direction of rotation, whereby, for instance, then only the part shown in FIG. 2, the brake 29 of which is opened, is required. The free-wheel drive can then be eliminated, and the coupling disk 20 can in turn be rigidly connected with the hollow shaft 13.

The separation disk 23 with the thrust bearing 22 would then be supported suitably directly against a correspondingly formed body on the side of the bearing cover. In order to achieve, thereby, the counter pressure against the springs 26, required for the center position of the rotor 12, an additional spring (not shown) may be provided between the bearing cover 17 on the contact side and the end of the hollow shaft 13, which operates the contacts. This additional pressure spring would join the rotation of the motor output shaft 14 and would be supported, therefore, by a thrust bearing in front of the bearing cover.

Finally, the shown and described embodiment of an electric motor switchable in two directions of rotation is to be considered merely an example for the practical realization of the present invention and is not limited thereto, rather other embodiments, as well as applications, are possible.

This relates not only to the constructively varied features, rather also to the fact that this motor can be used also for one direction of rotation only. Also the operation of the coupling, as well as of the switches or of the switch contacts, could as a variation of the shown embodiment, take place also by means of the motor output shaft.

In order to permit, even in case the network is not feeding, for instance, a manual opening or closing of the mechanism to be driven by the electric motor designed in accordance with the present invention, the motor output shaft 14 is projected on the coupling side through the bearing cover 17 and can be turned, for instance, by means of a crank of hexagonal cross-section complementary to a hexagonal member 38 mounted on the motor output shaft 14.

While we have disclosed several embodiments of the present invention, it is to be understood that these embodiments are given by example only and not in a limiting sense, the scope of the present invention being determined by the objects and the claims.

We claim:

1. An electric motor with pre-selectable number of revolutions and switchable in two directions of rotation, comprising
    a stator including a stator-winding,
    a motor shaft,
    a rotor formed as a slider and mounted on said motor shaft, as well as including an overload cutout means,
    a motor housing receiving said stator, said rotor and said overload cut-out means,
    said overload cut-out means comprising an overload coupling operatively connected with said rotor and said motor shaft, respectively,
    so that said overload coupling transmit the motor torque from said rotor to said motor shaft,
    means for adjusting said overload coupling in relation to the output motor torque, and
    means for disconnecting the operative connection between said rotor and said overload coupling upon surpassing said output motor torque.

2. The electric motor, as set forth in claim 1, wherein said motor shaft comprises two shafts disposed coaxially relative to each other and one of said two shafts is hollow receiving the other of said two shafts, to constitute the output shaft, and carries said rotor,
    said overload coupling comprises a driving coupling part and a driven coupling part,
    said one of said two shafts carries in addition said driving coupling part, and
    said other of said two shafts carries said driven coupling part, and
    said hollow one of said shafts and said other of said shafts are formed as a part of their length as a threaded spindle and a threaded spindle nut, respectively, engaging each other,
    so that said hollow one of said shafts is axially displaceable for the operation of said overload coupling upon rotation of said axially immovable output shaft.

3. The electric motor, as set forth in claim 4, wherein said overload coupling comprises
    two free-wheel drives effective in opposite directions and mounted on said hollow, one of said two shafts,
    a coupling disk coordinated to and cooperating with each of said free-wheel drives,
    means for retaining said coupling disks spaced apart from each other and for independent rotation,
    said overload coupling including a coupling housing connected with said output shaft for joint rotation,
    said coupling housing consisting of two housing parts,
    each of said two housing parts constitutes said driven coupling part and is equipped with a braking layer, and
    each of said coupling disks is connectable for operative connection with the corresponding of said coupling housing parts by means of said braking layers upon axial displacement of said hollow one of said two shafts.

4. The electric motor, as set forth in claim 3, wherein said parts of said coupling housing in operative connection with coupling disks by means of said braking layers are free-wheeling on said coupling disks and connected with each other, and one of said coupling housing parts is connected with said output shaft for joint rotation therewith.

5. The electric motor, as set forth in claim 3, wherein said coupling disks are hollow bodies receiving said free-wheel drives, and said retaining means for said coupling disks comprises two separation disks, an axial thrust bearing disposed between said separation disks spacing apart the latter, said separation disks being disposed between said coupling disks, and each of said separation disks is connected with the corresponding of said coupling disks for joint rotation therewith.

6. The electric motor, as set forth in claim 5, wherein said separation disks are free-wheeling radially about said hollow one of said two shafts.

7. The electric motor, as set forth in claim 5, which includes follower bolts connecting each of said separation disks with the corresponding of said coupling disks, and load springs disposed between each of said coupling disks and the corresponding of said separation disks for the axial pressure of said coupling disks on the corresponding of said braking layers of said coupling housing.

8. The electric motor, as set forth in claim 7, wherein said coupling disks have first recesses receiving said follower bolts and second recesses receiving said load springs, said first recesses are angularly spaced apart from said second recesses, said follower bolts have an axis parallel to the longitudinal axis of said output shaft and are axially displaceable in said first recesses of said coupling disks, and said load springs are immovably mounted in said separating disks and in said coupling disks.

9. The electric motor, as set forth in claim 8, wherein said follower bolts and said load springs are disposed along the periphery and in alternating order, such that said follower bolts and said load springs alternate in peripheral direction.

10. The electric motor, as set forth in claim 1, which includes switch contacts disposed in said motor housing for switching on and off, respectively, the current feed to and from said motor, respectively, and means for switching said switch contacts in response to the position of said overload coupling.

11. The electric motor, as set forth in claim 10, wherein said switching contacts include operating levers therefor, and said switching means comprises a collar secured selectively to said output shaft and said hollow shaft, respectively, and said operating levers being disposed within the range of displacement of said collar.

12. The electric motor, as set forth in claim 10, wherein said switching contacts are switched to shut off said motor directly with the shifting of said overload coupling into its inoperative position.

13. The electric motor, as set forth in claim 12, wherein said switching contacts are operated by axial displacement of said hollow one of said two shafts.

14. The electric motor, as set forth in claim 12, wherein said switching contacts are operated by axial displacement of said output shaft.

References Cited by the Examiner
UNITED STATES PATENTS 1,669,507   5/28   Dickson _____ 310—78

MILTON O. HIRSHFIELD, *Primary Examiner.*